United States Patent Office 2,988,977
Patented June 20, 1961

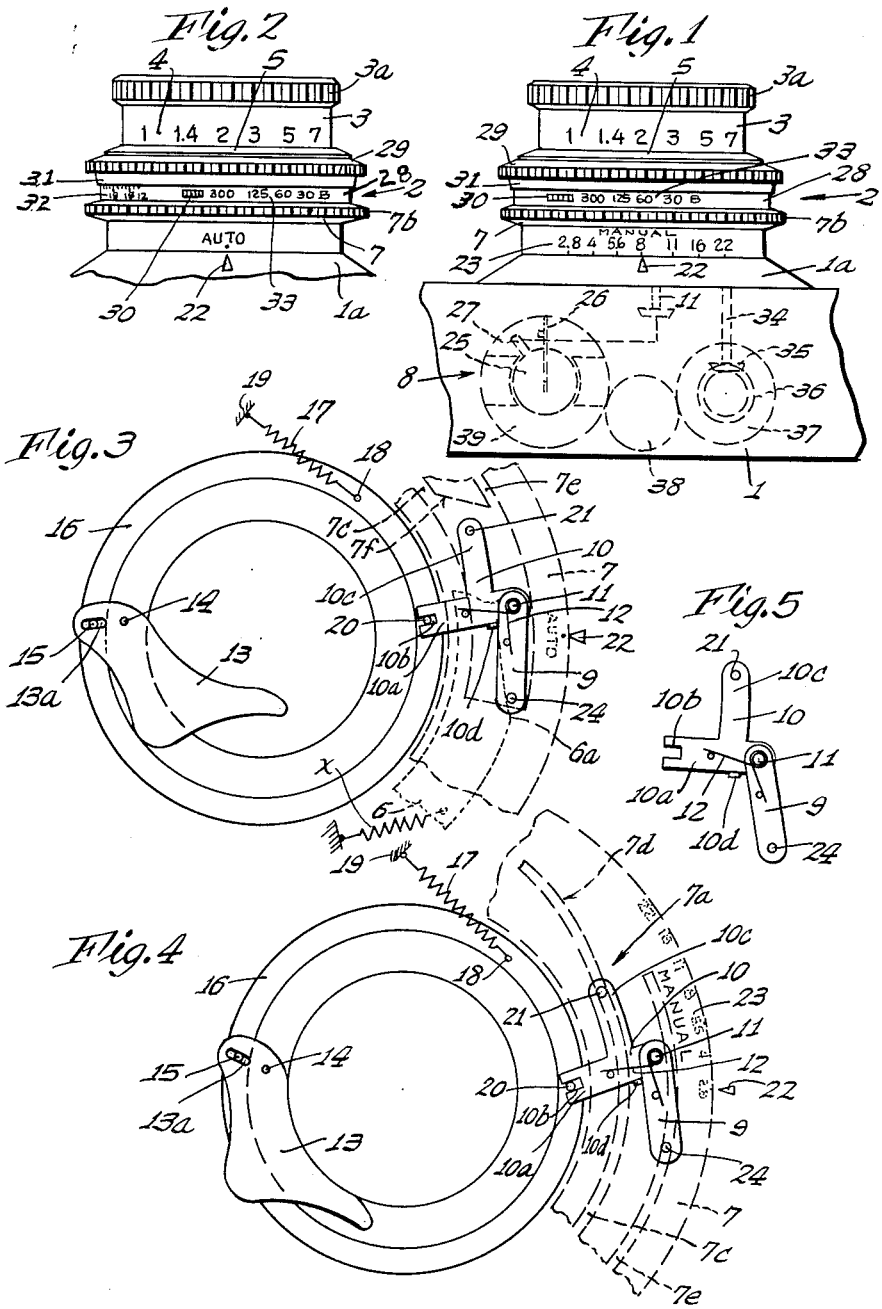

2,988,977
CAMERA
Waldemar T. Rentschler, Calmbach, Enz, Germany, assignor to Alfred Gauthier G.m.b.H., Calmbach, Enz, Germany, a corporation of Germany
Filed Mar. 23, 1960, Ser. No. 17,207
Claims priority, application Germany Mar. 25, 1959
2 Claims. (Cl. 95—64)

This invention relates to cameras wherein an automatic diaphragm setting is effected in response to operation of an exposure regulator.

An object of the invention is to provide a novel and improvided camera of the above type wherein, by means of simple and economical-to-manufacture structures, the setting of the diaphragm may be effected both automatically in response to operation of the exposure regulator and also manually, the said organization being characterized by a novel control system which makes it possible to effect by means of a single setting operation a change from automatic to non-automatic or manual diaphragm control for any setting position whatsoever of the exposure regulator without interfering with the latter, said organization being moreover adaptable to any type of exposure regulator.

This is accomplished, in accordance with the invention, by the provision of two independently movable diaphragm setting members or devices, one of which can be set or adjusted automatically by means of a powered driving device to the required position as determined by the response of the exposure regulator, whereas the other setting member is arranged to be manually operable. The organization also embraces two pivotally movable members arranged, for example, as levers which are used for connecting the two setting members or devices to the diaphragm adjusting mechanism, both of said levers being positioned about fixed axes and being held in abutting engagement with each other by a spring. One pivotal member or lever cooperates with a cam provided on the automatically adjusted setting member or device, said lever being also shifted in response to actuation of a switching or selector means from an "automatic" to a "non-automatic" position whereby the said lever cannot be influenced by the automatically adjusted setting device. In conjunction with this construction, the other pivotal member or lever is connected to the diaphragm setting mechanism and arranged to be actuated by a cam of the manually operable setting device when the selector means is set at the "non-automatic" or manual position.

A space-saving construction and one which involves relatively few components and is especially easy to operate, is had when the manually operable setting device is also constituted as the selector means.

An embodiment of the invention is illustrated in the accompanying drawings, in which:

FIG. 1 is a diagrammatic top plan view of a portion of a photographic camera having a diaphragm setting device as provided by the invention. The setting device is shown in the manual or non-automatic position.

FIG. 2 is a view like that of FIG. 1 but showing the selector means of the setting structure in the automatic position.

FIG. 3 is a fragmentary elevational view of components located at the interior of the intra-lens shutter assemblage of FIGS. 1 and 2, illustrating diagrammatically the cooperation of the various members of the diaphragm setting device, as provided by the invention, when the selector means thereof is positioned in the automatic setting.

FIG. 4 is a view generally like FIG. 3 but showing the selector means in the manual setting.

FIG. 5 is a fragmentary view or detail showing the positions of two pivotal members or levers of the diaphragm setting device as revealed in FIGS. 3 and 4, but indicating the relative positions of these levers when the manually operable setting device is in a position different from that shown in FIG. 4 and effecting a different value of diaphragm aperture.

Referring to FIG. 1, the housing or case of the camera is indicated by the numeral 1. Mounted on the front portion or wall 1a of the case 1 is a photographic intra-lens shutter assemblage 2, said assemblage having the usual built-in diaphragm and being supported in the well known manner, details of which are not shown. The intra-lens shutter assemblage 2 carries a range or distance setting ring 3 which is provided with a knurled periphery 3a for purposes of convenience of manipulation. The distance setting ring 3 is adjustable with respect to a stationary setting or index mark 5, and has a meter scale 4 which is referable to the said mark.

In accordance with the present invention, for the purpose of effecting adjustment of the diaphragm aperture there are provided two independently movable diaphragm setting members or devices, which are constituted as rings 6 and 7 as illustrated in the embodiment. The ring 6 is arranged to be automatically adjusted to a position suited to the existing light conditions, by means of an exposure regulator 8 and a suitable driving or transmission mechanism (all details of which are not shown for the sake of clarity of illustration), whereas the second setting ring or device 7 is manually operable. In conjunction with the two setting members or devices 6 and 7, the invention provides two pivotal members or levers 9 and 10 which serve to connect the two setting devices to the setting or adjusting mechanism of the diaphragm. The levers 9 and 10 are positioned about a fixed axis 11, indicated as a turnable spindle (the axis of which is not shiftable laterally), and the said levers are held in abutting engagement with each other by a spring 12. The lever 9 cooperates with a cam 6a provided on the automatically movable setting ring 6, and said lever is also pivotally shiftable in response to actuation of a switch or selector means as the latter is shifted from an automatic position to a non-automatic or manual position whereby the lever is disengaged from the cam edge 6a and held remote therefrom to remove it from the influence of the automatically movable setting ring 6. In the appended claims the lever 9 is referred to as a "second" lever. The other pivotal member or lever 10 (referred to in the claims as a "first" lever), is connected to the setting mechanism for the diaphragm and can be influenced or actuated by a cam 7a of the manually operable setting device 7 when the switching or selector means is set at the non-automatic or manual position.

The diaphragm of the intra-lens shutter assemblage 2, as employed in the embodiment of the invention, is constituted as a segment or sector type diaphragm having a plurality of lamellas. The lamellas, one of which is indicated at 13, are pivotally carried by fixed bearing pins 14 and have pin-and-slot connections 13a, 15 with a rotatable actuating or adjusting ring 16 which is urged by a spring 17 in a counter-clockwise direction for effecting the smallest diaphragm aperture. At one end of the spring 17 is affixed to a pin 18 carried by the ring 16, whereas the other end is secured to a fixed or anchorage member 19 provided on the camera.

One arm 10a of the above mentioned lever 10, which is shown as in the form of a bell crank, has a pin-and-slot connection 10b, 20 with the diaphragm actuating ring 16. The remaining lever arm 10c carries a pin 21 which is received in a control slot 7a of the manually operable setting ring or device 7, as seen in FIG. 4. The setting device 7 has the usual knurled periphery 7b to enable it to be conveniently grasped and turned. As is apparent from FIG. 4, the control or cam slot 7a is constructed in such a manner that a portion 7c thereof is concentric with the optical axis. For this concentric portion 7c of the control slot 7a the diaphragm remains in a setting position which provides the largest aperture or opening during partial turning of the ring 7. In the second portion 7d of the control slot 7a on the other hand, the diaphragm is adjusted according to the values of the diaphragm's scale 23 which is provided on the ring 7 and which is cooperable with a fixed index mark 22.

The pivotal member or lever 9, also termed the second lever, is of the one-armed type and cooperates by means of a cam follower pin 24 affixed thereto with the aforementioned cam 6a of the diaphragm setting member 6, which latter is automatically power-operated and positioned adjustably in response to operation of the exposure regulator 8.

The manually operable setting device 7, in the illustrated embodiment of the invention, is also utilized as a selector or switching device, by which the camera can be changed from automatic to non-automatic (manual) diaphragm adjustment and vice versa. In the case of a setting for automatic adjustment of the diaphragm, the ring 7 is placed in a setting position identified by the word "AUTO" as shown in FIG. 3, whereas it occupies one of a plurality of setting positions indicated by the values on the diaphragm scale 23 in a range designated "manual" when the selector means is arranged for non-automatic or manual adjustment of the diaphragm.

As can be seen in FIG. 3, the control influence of the cam slot 7a on the lever 10 is removed when the ring 7 is placed in the automatic position of FIG. 2. The lever 10 is thereby able to engage and have a driving connection with the lever 9, this being accomplished by means of a stop lug 10d provided on the lever 10 becoming engaged within an edge of the lever 9 under the action of the spring 12. Such spring is stronger than the spring 17 and overcomes the action of the latter, whereby adjusting pivoting movement of the lever 9, transmitted through the spring 12 in conjunction with the stop lug 10d, will effect a corresponding movement of the lever 10 and the diaphragm adjusting ring 16. A spring biased means similar to the spring 17 provided on the diaphragm adjusting ring 16 may be utilized with the diaphragm setting device 6, to impart a clockwise turning movement or torque to the latter. As shown in FIG. 3, an extension coil spring X may be utilized for this purpose, having one end connected with the setting device 6 and the other end suitably anchored in the camera. The setting device 6 when inoperative is held cocked in a counter-clockwise rotated position with the spring X tensioned. If such cocked setting ring or device 6 is now released to run off in a clockwise direction, which release may be effected in response to operation of the camera or shutter release, both of the levers 9 and 10 will pivot as a unit due to the action of the spring 17, the said pivoting movement being controlled by the cam 6a. The magnitude of such pivoting movement, and hence the adjusted diaphragm aperture, depends upon the size or extent of the movement of the ring 6 as determined by the exposure regulator. It will be understood that the lever 9 engages the ring 6 by virtue of the cam follower pin 24 being held in engagement with the cam edge 6a.

A cam 7e provided on the manually operable selector and diaphragm setting ring 7 serves, in the illustrated embodiment of the invention, to eliminate or nullify the control influence of the automatically movable setting ring 6 on the levers 9 and 10, when the selector means is adjusted for non-automatic or manual diaphragm setting. The cam 7e is arranged to be engaged by the follower pin 24 of the lever 9 when the selector and manually operable setting ring 7 is placed in the manual position, and such cam keeps the lever 9 in a position remote from the cam edge 6a and disengaged therefrom, as is illustrated in FIG. 4 of the drawing.

In order reliably to insure such engagement of the follower pin 24 with the cam 7e regardless of the adjusted position of the automatically movable setting ring 6 another cam 7f is provided on the selector and manually operable setting ring 7, the cam 7f being arranged to effect a pivotal movement of the lever 9, through suitable means, to properly position the latter for reception of the pin 24 thereof in the cam slot 7e at the time that the selecting operation is being carried out. Such pivotal movement of the lever 9 is effected against the action of the spring 17, and brings the lever 9 to the position shown in FIG. 4. This positioning of the lever 9 is accomplished by engagement of the cam edge 7f with the pin 21 of the lever 10, whereby the latter is pivoted counterclockwise. Subsequently a pin 21 of the lever 10 is made to enter the cam slot 7c, 7d of the adjusting ring 7.

As is apparent from FIG. 4, the diaphragm actuating ring 16 is influenced or actuated, in the case of non-automatic or manual diaphragm adjustment, exclusively by means of the lever 10 in conjunction with the control slot 7d of the ring 7. While FIG. 4 shows the lever 10 in the position associated with the greatest diaphragm aperture, this lever in FIG. 5 is shown as pivoted by means of the control slot 7d against the action of the spring 12 into a position corresponding to a smaller diaphragm aperture.

The exposure regulator 8 of the embodiment comprises a well-known exposure meter built into the camera and fed by the current from a photoelectric cell (not shown). The measuring mechanism or movement of the exposure regulator 8 shown diagrammatically in FIG. 1 comprises a turnable coil 25 having a needle 26 which may be held in different adjusted positions so as to constitute a stop for a sensing or feeling-out device 27 which is connected through a suitable transmission to the setting ring 6. The connection or transmission between the sensing member 27 and the setting ring 6 is shown only diagrammaticaly in FIG. 1 for the sake of clarity of illustration. A rotatable member or portion of the transmission may utilize the above-mentioned spindle or axle 11 which is provided for the two levers 9 and 10, as a bearing means. The lever 9 may be fixedly secured to the spindle 11, whereas the lever 10 is loosely positioned or carried by the same. In the case of an automatic setting of the diaphragm, the setting ring 6 is able to move under the urging of the extension spring X until it is halted by abutment of the sensing member 27 with the secured needle 26 of the exposure meter.

Additional exposure-influencing factors other than the diaphragm, such as the factors of exposure time, film sensitivity and filter, are taken into consideration in the illustrated embodiment of the invention by providing for rotatable adjustment of the measuring mechanism or movement of the exposure meter in a well-known manner. The measuring mechanism or movement of the embodiment is adjusted in response to adjustment of the exposure time or shutter speed setting ring of the shutter. The said ring is constructed of two relatively adjustable members or portions 28 and 29 which can be coupled to each other in different relative positions by means of a releasable coupling device 30 as shown in FIG. 1. The relative setting of the two rings 28 and 29 is effected in connection with a film sensitivity scale 31 which is mounted on the ring 28 and cooperates with a setting mark 32 provided on the ring 29. The setting of both rings while in the coupled state, is done in conjunction with an exposure time scale 33 also provided on the ring 28 and referable to the aforementioned stationary setting mark 22. The transmission of the respective setting positions of the rings 28 and 29 to the exposure meter is effected, in the illustrated embodiment of the invention, by means of a gear drive. For this purpose there is provided a rotatable shaft 34 which is drivingly connected to the ring 28 and has a bevel gear 35 meshing with a cooperable bevel gear 36, the latter being connected to a spur gear 37. The gear 37 meshes with an idler gear 38 which latter in turn meshes with a toothed rotatable carrier plate 39 of the exposure meter measuring mechanism.

By the above construction there is provided in accordance with the invention a novel and improved camera having an automatic diaphragm setting mechanism which is responsive to the operation of an exposure regulator, said camera being characterized by special advantages with regard to its applicability, simplified structure and mode of operation. These advantages more particularly are such that a camera as constructed in accordance with the invention has an extended useful range practically the same as with well-known cameras not having exposure regulators, because of the possibility of effecting a manual adjustment of the diaphragm; at the same time, the change from automatic to non-automatic setting of the diaphragm does not involve any difficulty or conditions of any kind, either with respect to the mode of operation of the camera or with respect to its structure. On the contrary, the switching or selecting of the type of operation (from one type of diaphragm setting to the other) merely requires a single switching or selecting operation which consists in setting the selector means in the position associated with the desired type of diaphragm setting. It is of special importance in this connection that neither a specific setting position of the exposure regulator nor of the diaphragm mechanism is required, nor is there any interference with the functioning or structure of the exposure regulator, when carrying out the selecting operation. This enables any kind of exposure regulator to be utilized, and any kind of diaphragm mechanism, in a camera constructed in accordance with the invention. Therefore, it is possible to obtain an optimal adaptability of the regulator and diaphragm devices to the structure of a particular camera.

The two pivotal members which are used for connecting the diaphragm to the automatically movable setting member and the manually operable setting device are constituted as levers in the illustrated embodiment of the invention. However, analogously it would be possible to use instead of levers, pivotal toothed segments which mesh with gears provided on the setting members.

I claim:

1. In a camera of the type having a diaphragm which is automatically regulated by an exposure regulator, in combination, two independently movable diaphragm setting devices; means including a powered driving device, for actuating one of said setting devices, said other setting device being manually operable; a diaphragm adjusting mechanism; means including a first lever and cooperable cam means on the lever and on the said manually operable setting device, for connecting said mechanism with the manually operable setting device for actuation thereby to adjust the diaphragm aperture; a second lever arranged for abutting engagement with the first lever under spring action, said levers being pivotally movable about fixed axes; cooperable cam elements on said one setting device and said second lever, coupling these for movement of the lever by said one setting device, such movement effecting a movement of the first lever through the said abutting engagement; means connected with the exposure regulator, controlling the positioning of said one setting device and coupled second lever in accordance with existing light conditions; a selector means movable between "automatic" and "manual" positions; means shifting said second lever, in response to movement of the selector means to "manual" position, to disengage the said cooperable cam elements, said cooperable cam means of the first lever and manually operable setting device being rendered operative when the selector means is in the "manual" position.

2. The invention as defined in claim 1, in which the manually operable setting device constitutes the said selector means.

References Cited in the file of this patent

UNITED STATES PATENTS

| | | |
|---|---|---|
| 2,841,064 | Bagby et al. | July 1, 1958 |
| 2,923,216 | Greger | Feb. 2, 1960 |
| 2,925,760 | Broschke | Feb. 23, 1960 |
| 2,926,571 | Sommer | Mar. 1, 1960 |